March 7, 1967  R. T. BROWN  3,307,862
QUICK-DISCONNECT FLUID CONDUIT CONNECTION
Filed Sept. 15, 1964  4 Sheets-Sheet 1

INVENTOR
ROBERT T. BROWN

BY Cushman, Darby & Cushman
ATTORNEYS

March 7, 1967 R. T. BROWN 3,307,862
QUICK-DISCONNECT FLUID CONDUIT CONNECTION
Filed Sept. 15, 1964 4 Sheets-Sheet 2
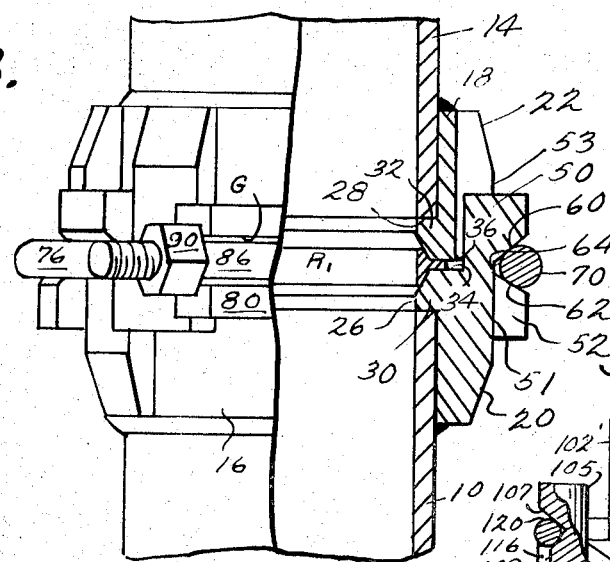
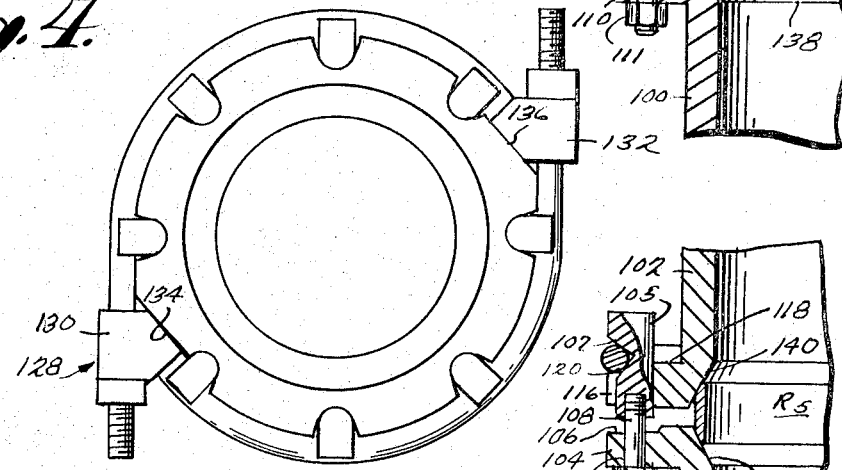
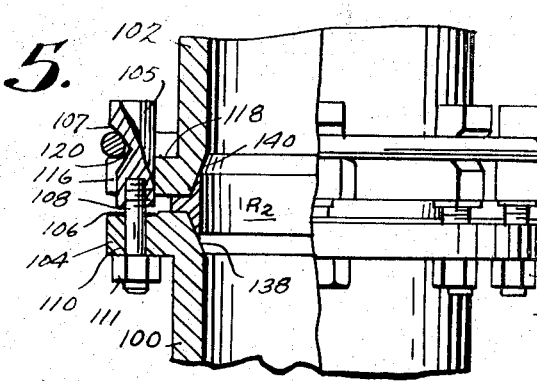
INVENTOR
ROBERT T. BROWN
BY
Cushman, Darby & Cushman
ATTORNEYS March 7, 1967  R. T. BROWN  3,307,862
QUICK-DISCONNECT FLUID CONDUIT CONNECTION
Filed Sept. 15, 1964  4 Sheets-Sheet 3

INVENTOR
ROBERT T. BROWN
BY Cushman, Darby & Cushman
ATTORNEYS

March 7, 1967 R. T. BROWN 3,307,862
QUICK-DISCONNECT FLUID CONDUIT CONNECTION
Filed Sept. 15, 1964 4 Sheets-Sheet 4

INVENTOR
ROBERT T. BROWN
BY Cushman, Darby & Cushman
ATTORNEYS 3,307,862
QUICK-DISCONNECT FLUID CONDUIT
CONNECTION
Robert T. Brown, Houston, Tex., assignor to Gray Tool
Company, Houston, Tex., a corporation of Texas
Filed Sept. 15, 1964, Ser. No. 396,641
1 Claim. (Cl. 285—364)

The present invention relates to fluid conduit connections and sealing means therefor. More particularly, the invention relates to improvements in such connections designed to afford the advantages of a quick-detachable coupling, yet provide a fluid-tight seal capable of withstanding high pressures, without constriction of the fluid flow passage, which may be repeatedly broken and re-joined without substitution of parts or loss of efficiency.

Accordingly, it is an object of the present invention to provide an improved conduit connection which facilitates the making and breaking of fluid pressure-tight joints conveniently and quickly.

Another object of the invention is to provide improved conduit coupling and sealing means of uncomplicated design, inexpensive to manufacture and exhibiting unusual strength, rigidity, versatility, and permanence.

A further object of the invention is to provide a conduit connection in which a pressure-tight seal may be uniformly obtained time after time with the use of a minimum number of tools, and without special skills or knowledge on the part of the operator thereof, without fear of damage to the sealing means and consequent deterioration of the effectiveness of the seal.

A further object is to provide a conduit connection which can be removed, and the conduit parts subsequently rejoined in the field without the substitution or addition of new elements.

A still further object is to provide a conduit connection which secures automatic self-alignment of the conduit ends or similar parts being connected, thus insuring rapid and proper positioning of the conduit ends in the desired relation with respect to each other.

A still further object is to provide a conduit connection wherein a full bore opening is maintained between the joined conduit ends. That is, the fluid-flow passage is maintained substantially uniform between the respective conduit parts so that the fluid moving therein travels without restriction and the consequent excess disturbance and friction loss of energy.

A still further object is to provide a conduit connection of novel construction in which the coupling means may be applied rapidly and conveniently while maintaining substantially equal force at all points along the sealing periphery of the conduit ends as they are being joined in pressure-tight relation.

Various other objects and advantages of the invention will become apparent from the detailed description set forth below.

In the drawings:

FIGURE 3 is a side elevational view, partially broken away and partially in section, but enlarged, and showing the construction in more detail;

FIGURE 4 is an end elevational view of another embodiment of the present invention;

FIGURE 5 is a side-elevational view, partially in section and partially broken away, showing further details of construction of FIGURE 4;

FIGURES 12 and 13 are fragmentary sectional views similar to FIGURE 5 and showing the principles of the invention utilized in couplings including conduit sealing annuli of modified construction;

Figure 1:
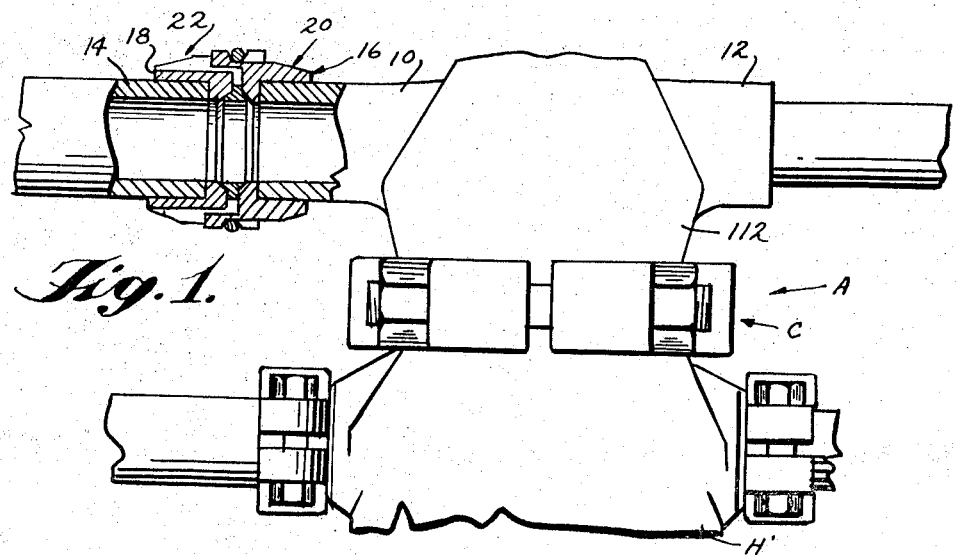
FIGURE 1 is a side-elevational view of a portion of an assembly used in the well head, or super-structure, of an oil well. The view shows one of the outlet nipples from the well head in section, one embodiment of the invention joining the nipple to an adjacent pipe section.

In FIGURE 1, an oil well super-structure assembly, indicated generally at A, is shown, comprising for example, a first casing head H' and a second casing head H² mounted above the same and connected thereto by a clamp C. The casing head H² is shown typically equipped with a plurality of outlet nipples, 10, 12, to which conduits or pipes may be connected to receive and carry away oil to other fluids arising from beneath the surface of the earth. It is to be understood, however, that the environment shown in FIGURE 1 and described herein is merely illustrative of the various applications that the invention may have, and is not in any way limited thereto. The reference to "oil" or "other fluids" herein may be understood to embrace with equal force and effect such various fluids as water, natural gas, liquid chemicals, or the like. Broadly speaking, the invention may be employed wherever it is desired that the ends of fluid-carrying conduits, pipes or tubes be joined together in a pressure-tight relation.

FIGURE 1, then, sets forth one principal embodiment of the invention. The nipple 10 is shown connected by the invention to a fluid receiving pipe or conduit 14. Secured around the outer periphery of the nipple 10 and pipe 14, as by welding, are sleeves 16 and 18, each of which carry thereon a plurality of lugs 20 and 22, respectively.

Figure 2:
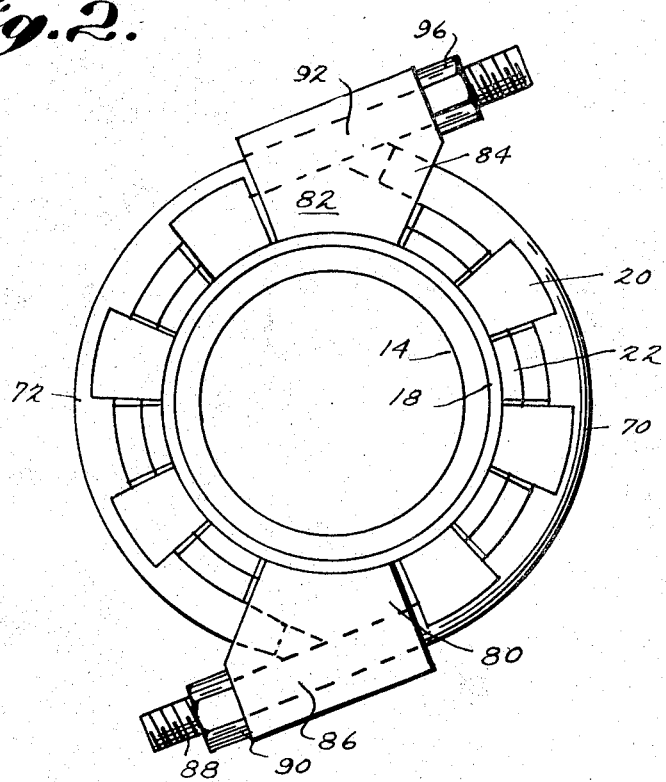
FIGURE 2 is an enlarged end elevational view of the embodiment shown in FIGURE 1.

As will best be seen from FIGURES 2 and 3, the lugs 20 and 22 on the sleeves 16 and 18 are integrally formed therewith and are circumferentially spaced around the outer periphery of the sleeves. It should be understood at this point, however, that the lugs need not be integrally formed with the sleeves, but may be formed separately and then secured to the sleeves, both forms coming within the scope of my invention.

The sleeves 16 and 18 also each have an inner annular flange, 30 and 32 respectively, extending from the sleeve adially inwardly toward the axis of the respective conduit part. The flange 30 has a surface which engages the end surface 26 of the nipple 10 and the flange 32 similarly has a corresponding surface which engages the end surface 28 of the pipe 14. The flanges 30 and 32 extend in an axial direction beyond the end surfaces of their respective conduits, thus forming extensions of the conduit parts, and presents opposed flat end surfaces 34 and 36 when the said end surfaces of the nipple 10 and pipe 14 are adjacent each other in assembled relationship.

Figure 8:
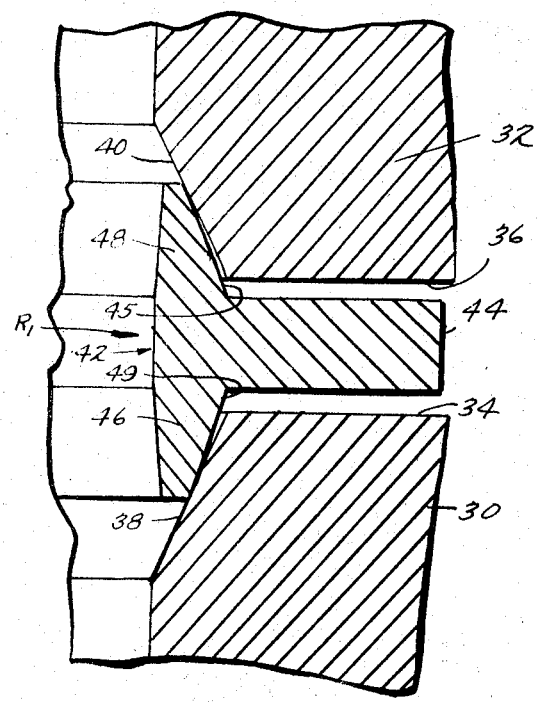
FIGURES 8 and 9 are enlarged vertical sectional views of the sealing ring employed in the embodiments shown in FIGURES 1, 3, 5 and 7, particularly illustrating the manner in which the novel sealing ring is deformed as it is forced into sealing position between opposed conduit end parts.

Referring now to FIGURE 8, wherein the sealing parts are shown with greater clarity, a sealing ring $R_1$ is disposed between the end surface 34 of the flange 30 and the end surface 36 of the flange 32 when said surfaces are presented toward one another. The inner walls of the conduit extensions formed by the flanges 30 and 32 terminate in sealing surface 38 and 40 which flare outwardly toward the flat end surface 34 and 36. The angle at which these walls flare is not critical, but preferably is relatively small, in the range 15° to 30°, as will be more fully explained hereinafter. Also preferably, the sealing surfaces 38 and 40 should be polished, so as to obtain a more effective seal with the sealing ring $R_1$.

Figure 9:
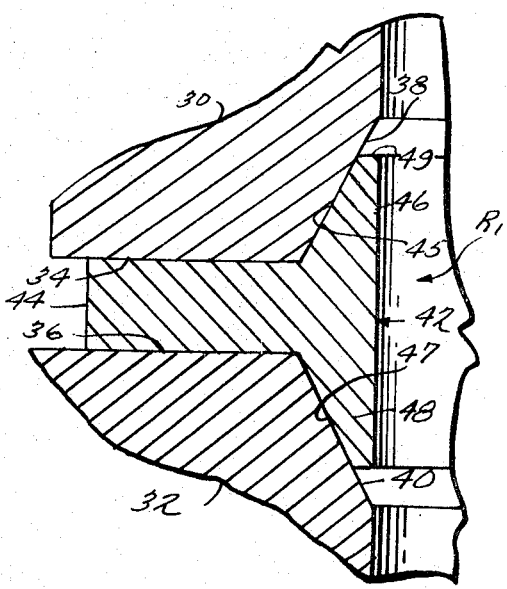

The sealing ring $R_1$ is constructed of a hard elastic material, preferably steel. This sealing ring comprises an annular flange portion 42, the bore of which is preferably substantially equal to the bores of the conduit parts 10 and 14, as hereinafter explained, and a rib portion 44 integrally formed therewith and extending outwardly from said flange portion. The rib 44 is substantially centrally disposed exteriorly of the flange portion 42, and is positioned between the flat end surfaces 34 and 36 of the sleeves 16 and 18. The flange portion 42 comprises lip portions 46 and 48 extending in opposite, generally axial, directions from each side of the rib 44, the outer surfaces, 45 and 47 respectively, of each lip tapering axially away from the rib at an obtuse angle with respect to the adjacent surface of the rib 44. Thus, the lips 46 and 48 have a substantially triangular cross-section, the outer tips 49 of which may be truncated, as shown in FIGURE 9, in order to eliminate weak ends. Weak, or pointed, ends in spite of the elasticity of the material, tend to crack and break under repeated usage, and may cause failure of the entire ring. Again, the angle at which the outer surfaces 45, 47 of the lips taper is not critical, within limits, but to satisfy the purposes of the invention must be less than the angle of flare of the sleeve flange sealing surfaces 38 and 40. The elastic lips 46 and 48, having the lesser angle of taper, are deflected inwardly, due to a wedging action with the sealing surfaces 38 and 40, in the completed seal shown in FIGURE 9. The range of 15° to 30° for the flaring surfaces 38 and 40 and the tapering lips 46 and 48 is desirable in order that the lip surfaces 45 and 47 wedge smoothly and properly with the surfaces 38 and 40 without requiring excessive axial compressive forces to effect the wedging.

The sealing ring illustrated in the drawings and described above per se is well-known, and is disclosed in U.S. Letters Patent No. 2,766,829, issued to J. D. Watts et al. on October 16, 1956.

As is best seen in FIGURE 3, the lugs 20 and 22 on the sleeves 16 and 18 each extend radially outwardly from said sleeves and have a finger portion, 50 and 52 respectively, thereon extending beyond, in an axial direction, the associated flanges 30 and 32. The lugs and associated finger portions on each sleeve are space circumferentially thereon, as mentioned above, so that the finger portions 50 on sleeve 16 intermesh with the finger portions 52 on sleeve 18 in alternating fashion when the conduit parts are brought together in sealing position during assembly of the connection. The finger portion 50 is provided with a substantially flat outer surface 51 and is further provided with a shoulder 60, angularly tapering outwardly from this flat surface. Likewise, the finger portion 52 is provided with a substantially flat outer surface 53 and is also provided with a shoulder 62 angularly tapering outwardly from the flat surface 53. The shoulders on adjacent interfitting fingers define a diverging outwardly-opening channel 64 around the periphery of the sleeves 16 and 18. This channel 64 is not smooth and continuous, but, as should be obvious from the above description, has sectional walls, formed by the shoulders 60 and 62, which are open alternately to one side or the other.

The conduit parts are coupled together by suitable flexible means, such as cable sections 70, 72 which are inserted into the channel 64 and lay partially therein, supported by the shoulders 60 and 62 along a substantial portion of their lengths, as shown in FIGURE 2. By such an arrangement the cables 70 and 72 are held spaced from the bottom of the channel 64.

Associated with the sleeves 16 and 18 are a pair of tightening heads 80 and 82. These heads are disposed in operation, on the outer periphery of the sleeves and rest thereon in substantial alignment with the peripheral channel 64. One side of each of the tightening heads 80 and 82 is adapted to have secured thereto one end of a cable section 70, 72. For example, as shown in FIGURE 2, the tightening head 82 has a threaded bore which receives the correspondingly threaded end 84 of cable 70. The outer surface of each of the tightening heads 80, 82 has a groove G (see FIGURE 3) therein adapted to fully receive a portion of the cable body 70, 72 respectively.

More particularly, as seen from FIGURE 2, the head 82 is disposed on one side of the conduit parts and has one end 84 of the cable 70 secured thereto, while the major portion of the cable, intermediate on the ends 84, 86, lies partially recessed within the annular channel 64, as I have previously described. The free end 86 of the cable 70 terminates in an exterior threaded portion 88. The head 80, having the groove G in its outer surface, is disposed on the opposite side of the sleeves 16 and 18 from the head 82. The free end 86 is received entirely within the groove G in head 80 and a threaded nut 90 on the threaded portion 88 firmly abuts the surface of the head 80 securing the free end 86 to the head 80 due to the restraining force exerted by the head 82 on the opposite end of the cable 70.

In like manner, cable section 72 has one of its ends secured to the head 80, its main body portion lying partially within the channel 64, and its opposite free end 92 lying entirely within the groove G formed in the outer surface of head 82. Also in like manner, a nut 96 on the threaded free end of cable 72 abuts the head 82, restraining the cable and holding it firmly within the annular channel 64.

It is to be noted that in each instance, the end 84 of the cable 70 and its counter-part on cable 72 are secured to the head at a point which permits the cable to be recessed in the portion of the channel intermediate the heads. Further, the free ends of the cable sections 70 and 72 lie in the grooves G in substantially straight lines which are substantially tangent to the annular channel 64 as will be understood more clearly from the operation of the clamping means.

OPERATION

The operation of the sealing ring is best shown in FIGURES 8 and 9.

The procedure for employing the invention in obtaining an effective pressure-tight seal is as follows: The conduit parts 10 and 14, each carrying the lug-bearing sleeves are positioned adjacent each other with their end surfaces presented toward one another. The sealing ring $R_1$ is then placed between the end surfaces of the opposed flange end surfaces 34 and 36. The conduit parts are then moved together so that the flaring surfaces 38 and 40 on the conduit parts each engage the flared sealing lip surfaces 45 and 47, respectively. At this point, it will be recognized that as the conduit parts are advanced toward final engagement, the said engaging sealing surfaces tend to guide the parts together in the desired final axial alignment. Thus, it will be obvious that lack of proper care or errors in judgment due to haste on the part of the operator, within limits, will not result in faulty positioning of the parts and consequent failure of the seal.

At the point at which the conduit parts engage the sealing ring, as described above and shown in detail in FIGURE 8, the fingers on the opposed sleeves are interfitting and the shoulders thereon define the annular channel 64. The tightening heads, cables, and nuts are then assembled around the conduit ends in the positions described above. The subsequent tightening of the nuts on the cable ends radially contracts the cables and causes them to wedge deeper into the annular channel, thereby axially spreading the walls of the channel in opposite directions and necessarily drawing the conduit parts closer together. As the tightening of the nuts continues, the lip portions of the sealing ring are subjected to a wedging action and are deflected inwardly to conform more and more to the sealing surfaces, 38 and 40, until the flat surfaces 34 and 36 on the flanges each firmly engage the rib portion 44, as shown in FIGURE 9. Since the sealing ring is preferably made of elastic steel, the lip portions are deflected inwardly from their normal position, shown in FIGURE 8, to the position shown in FIGURE 9, when the surfaces 38, 47 and 40, 45, respectively are wedged together, without exceeding the elastic limit of the metal. At that moment, the fluid-tight seal is complete and resistance to the turning of the nuts will substantially increase, thereby alerting the operator to the fact that the seal has been completed. It should be noted that the wedging action of the cable sections applies a substantially equal force on all of the lugs that they touch, and therefore the conduit parts are smoothly drawn together and bear evenly against the rib at all points around the periphery of the sealing ring, thus ensuring a uniform seal. Extra turning of the nuts 90, 96, due to inexperience of the operator, however, will not cause further deformation of the lips of the sealing ring and ruin the proper seal because the surfaces 34 and 36 merely bear harder against the rib portion without appreciable relative movement of the sealing parts.

In the completed connection, the flange portions of the sealing ring are essentially supplementary to the opposed outwardly flaring inner walls of the conduit end parts and thus, when the bore of the ring is equal to the bores of the conduit parts, a substantially smooth and unconstricted fluid flow passage is maintained through the conduits. Those skilled in the art will recognize that a smooth passage, as just described, is highly desirably due to the consequent low turbulence of the flowing oil and relatively low frictional head losses incurred.

Thus it is seen that the present invention allows the rapid and convenient sealing of conduit parts in pressure-tight relation, with minimum skill on the part of the operator, while requiring a minimum number of tools in the operation.

As mentioned previously, the conduit may be rapidly and conveniently disconnected by reversing the procedure described above. Further, because the sealing ring $R_1$ is highly elastic, it is not permanently deformed, but regains its normal shape when removed from sealing engagement and may be re-used again and again without loss of effectiveness.

As will shortly be apparent, the present invention may be embodied in a number of forms. FIGURES 4 and 5 show another embodiment wherein the conduit parts 100 and 102 have radially extending annular flanges integrally formed therewith. The flange 104 on the first conduit part 100 has a plurality of circumferentially spaced finger members 105 secured thereto which extend beyond the end surfaces 106 of the flange 104. These finger portions, or members, may be integrally formed with the flange or welded thereto but, preferably, for convenience of manufacture and versatility, are secured to the flange by means of threaded connectors 108 which are received within apertures 110 in the flange and secured therein by means of nuts 111. The fingers 105, similarly to those in the embodiment first described, have an outwardly tapering shoulder 107 on their outer surfaces.

The flange on the second conduit part 102 is radially slotted to provide a plurality of outwardly extending circumferentially spaced lugs 116 which are adapted to interfit with the fingers 105 when the first and second conduit parts are in an adjacent axially aligned position with their end surfaces presented toward each other. In this interfitting position, the shoulder 107 on the fingers 105 cooperates with a flat surface 118 on the side of the lugs 116 to define the outwardly diverging walls of an interrupted annular channel 120. A tightening, or clamping, means 128 comprising flexible cables and heads 130 and 132, similar to that previously described, is employed to draw the conduit parts together in sealing relation. It will be noted, as seen in FIGURE 4, that the tightening heads 130 and 132 are seated on the adjacent flattened outer surfaces 134 and 136 of the flanges 104 and 116 rather than on the outer surfaces of conduit sleeves, as previously described. In this embodiment sleeves such as 16 and 18 of the first embodiment are omitted and the flaring sealing surface walls 138 and 140 are integral with the respective conduit parts, accommodating the sealing ring $R_2$ therebetween.

Figure 6:
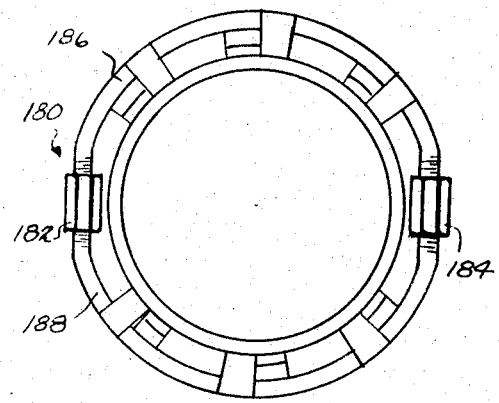
FIGURE 6 is an end-elevational view of another embodiment of the invention.
Figure 7:
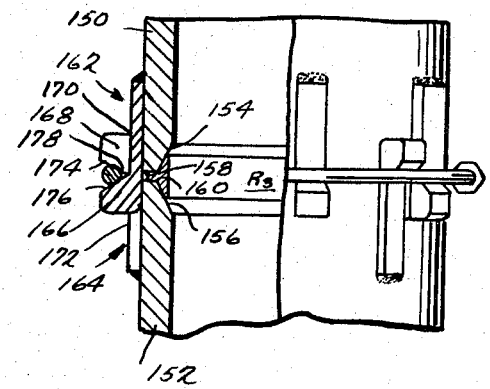
FIGURE 7 is a side-elevational view of the embodiment shown in FIGURE 6, partially in section partially broken away.

Another embodiment of the invention is shown in FIGURES 6 and 7 wherein conduit end parts 150 and 152 are held assembled in sealing relation by a modified form of clamp. The opposed conduit end parts 150 and 152 have inner walls which terminate in outwardly flaring sealing surfaces 154 and 156, respectively, adjacent the flat end surfaces 158 and 160, as in the embodiment of FIGURES 4 and 5.

It should be noted that the conduit walls must be sufficiently thick that the reduced portions of the walls, adjacent the sealing surfaces 154, 156 are not so thin and weak that they can not withstand the forces applied thereagainst during the use of the conduits in the desired application of the connection. It will be seen that the strength of the reduced portions varies directly with the strength of the conduit metal and the unreduced wall thickness, and inversely with the angle of flare of the sealing surfaces 154 and 156. With this word of caution, the proper wall thickness for a particular application may be calculated according to general principles well known in the engineering arts.

A plurality of circumferentially spaced lugs 162 and 164 are welded to the outer surfaces of the conduit parts 150 and 152, respectively. Each of the lugs 162 is provided with a finger portion 166 which projects beyond the edge of the associated conduit end 150 and interfits with adjacent finger portions 168 on lugs 164, which similarly project beyond the end surface of conduit 152. These finger portions 166, 168 each have a flat outer surface 170, 172 and are provided with a shoulder 174, 176, respectively, angularly outwardly extending from this flat surface. In the interfitting positions, the shoulders 174 and 176 on adjacent fingers define an outwardly-opening, diverging annular channel 178, as in the embodiment of FIGURES 2 and 3.

The sealing ring $R_3$ is disposed between the flaring sealing surfaces 154 and 156, similarly to the ring shown in FIGURE 9, and has a rib portion whose sides abut the end surfaces 158 and 160 of the conduit parts.

The tightening means 180 of this embodiment comprises a pair of heads 182 and 184 and flexible means such as cables sections 186 and 188. The head 182 comprises an elongated fastener, having an internally threaded bore, which is adapted to receive a threaded end portion of cable sections 186 and 188 and to adjustably advance into, or out of, engagement with both of these cable sections at the same time. Head 184 is identical to head 82 and is similarly internally threaded to adjustably receive the opposite ends of the cable sections 186 and 188 which are also threaded. As the ends of the cables are drawn into the heads 182 and 184, the cable sections 186 and 188 are radially contracted and thereby wedged into the annular channel 178. As in the previous embodiments, this wedging action against the shoulders 174 and 176, which form the walls of the channel 178, draws the conduit parts 150 and 152 together and completes and maintains the sealing arrangement.

It should be understood, however, that the tightening heads 182 and 184 may, for purposes of this invention and as exigencies require, be substituted for the heads 80 and 82 of FIGURES 2 and 3 or heads 130 and 132 of FIGURES 4 and 5, or vice versa.

Figure 10:
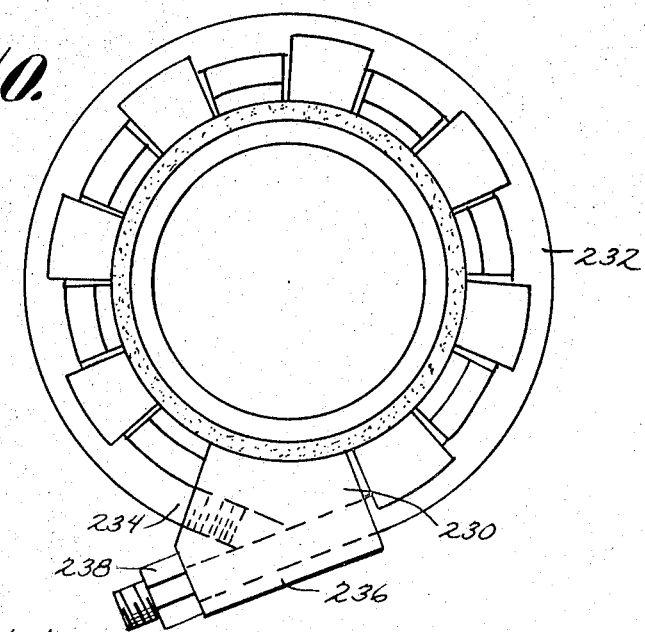
FIGURE 10 is an end-elevational view of still another embodiment of the present invention.
Figure 11:
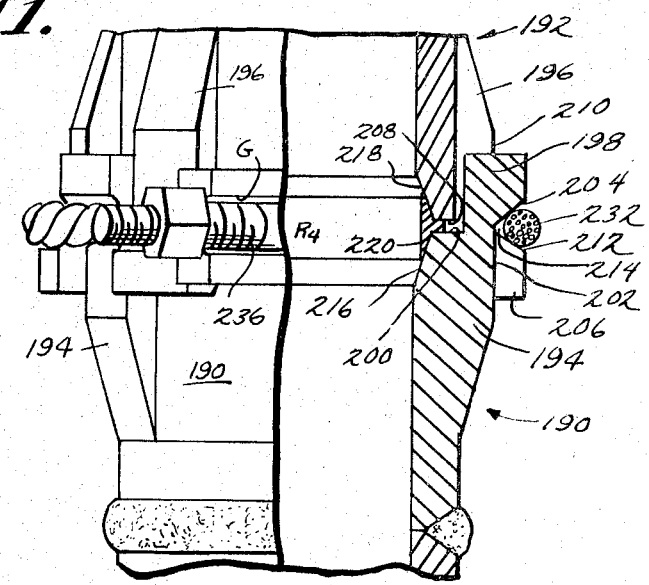
FIGURE 11 is a side-elevational view, partially in section and partially broken away of the embodiment shown in FIGURE 10.

In a still further embodiment shown in FIGURES 10 and 11, sleeves and lugs similar to those shown in FIGURES 2 and 3 are integrally formed with conduit sections 190 and 192. The conduit sections 190 and 192 may be cast in short lengths and later secured, in the field if necessary, to the plain ends of the conduit parts to be joined. More particularly, the sections 190 and 192 preferably are formed with a wall thickness and bore equal to that of the conduits to which they are subsequently joined. Each conduit section 190 and 192 has a plurality of circumferentially spaced lugs 194 and 196, respectively, on the outer periphery thereof similar to the embodiments previously described. Each lug 194 has a finger portion 198 extending axially beyond the flat end 200 of the conduit section 190 and each finger portion has a flat outer surface 202 and is provided with an outwardly extending shoulder 204 which tapers toward the extending end of the finger as it rises from this flat surface. Each of the lugs 196 is similarly provided with a finger portion 206 extending beyond the end 208 of conduit section 192, the fingers 206 having a flat outer surface 210 and an angularly outwardly extending shoulder 212. As in the embodiment of FIGURES 2 and 3, the fingers 198 are spaced so as to alternately interfit with the fingers 206 and place the adjacent opposing shoulders 204 and 212 in relative positions where they cooperate to define the walls of an interrupted annular channel 214.

The inner walls of the conduit sections 190 and 192 adjacent the ends 200 and 208 terminate in sealing surfaces 216 and 218, respectively, which flare outwardly toward the adjacent end. Subsequent to the casting of the sections, these flaring surfaces are machined to provide smooth sealing surfaces. As in the other embodiments, these surfaces 216 and 218 engage oppositely disposed lip portions 220 and 222, respectively, of a sealing ring $R_4$ in the assembled connection.

The tightening means, shown in FIGURE 10, comprises a single head 230 and the flexible means comprises a single cable section 232 supported in the annular channel 214 by the shoulders 204 and 212, the ends of which are secured to the single head in the same manner as described in the initial embodiment. That is, one end 234 of the cable 232 is secured to one side of the head 230 and the body of the cable extends around the periphery of the intermeshing fingers 198 and 206 and is received by the annular channel 214. The other or free end 236 of the cable is received by a groove G (see FIGURE 11) in the outer surface of the head 230 and secured therein by means of a nut 238.

Further embodiments illustrating the broad applicability of the principles of the present invention are shown in FIGURES 12 and 13 which include the cable-employing tightening means previously described in regard to FIGURES 4 and 5. Identical elements are given the numerals used in connection with these figures. Conversely, the modified conduits and sealing annuli shown in FIGURES 12 and 13 could be employed with others of the cable-employing tightening means of the invention as described hereinabove.

The embodiment depicted in FIGURE 12 differs from that shown in FIGURE 5 in that the separate sealing annulus $R_2$ has been eliminated and an elastic, hard metal, generally triangular cross-section integral sealing lip 200 formed on conduit 102' as an axial extension thereof.

The lip 200 carries a tapered sealing surface 202 having a taper angle which, in the unstressed condition of the lip, is less than that of the flared sealing surface carried by the conduit 100 the details regarding which are more completely discussed in the description hereinbefore of the sealed coupling shown in FIGURE 9.

As shown the lip 200 sealing surface 202 has been axially brought into stressed surface to surface sealing engagement with the flared sealing surface of the conduit 100 by the action of the novel cable employing tightening means discussed in regard to FIGURES 4 and 5.

In the embodiment of FIGURE 12, the abutment of flange end surfaces 204 and 206 on the conduits 102' and 100 serves as a positive stop to limit the deflection of the lip 200 to within the elastic limit thereof so that the coupling elements, including the lip-carrying conduit 102', are all reusable.

Turning now to FIGURE 13, an embodiment similar to that shown in FIGURES 4 and 5 but for the inclusion of a modified sealing ring, $R_5$ is shown. The ring $R_5$ is preferably composed of elastic hard metal and is similar in all respects to rings $R_1$–$R_4$ previously described herein, but for the elimination of the central, radially directed, relatively non-deflectable rib included in those embodiments. The ring $R_5$ can be advantageously utilized in some applications where weight saving and space are prominent factors to be considered.

It will thus be seen that there have been provided by the invention several embodiments in which the various objects hereinbefore set forth, together with other practical advantages, are successfully achieved. As partially exemplified in the foregoing description, various other possible embodiments may be constructed by interposing the mechanical features of the embodiments set forth without departing from the scope of my invention, and, therefore, it is to be understood that all matter hereinbefore described or shown in the accompanying drawings is to be interpreted as illustrative and not restrictive.

I claim:

A high pressure connection comprising: first and second axially aligned fluid confining elements having end surfaces presented toward each other seal means located adjacent said end surfaces; means defining a radially outwardly projecting annular circumferential flange on each of said first and second fluid confining elements adjacent said end surfaces; means defining a plurality of angularly spaced, axially extending apertures through one of said flanges, means defining a plurality of angularly spaced, axially extending, radially outwardly opening recesses in the outer periphery of the other of said flanges in registry with said apertures; finger means secured to said one flange by means passing through said apertures and extending from said apertures toward said other flange into said recesses and axially beyond said other flange; means defining a radially outwardly extending rear surface on said other flange, means defining a radially outwardly extending wedging surface on each of said finger means on the portion thereof which extends beyond said other flange, the wedging surfaces facing said other flange rear surface and defining an acute angle with said flange rear surface and forming an interrupted circumferential, radially outwardly opening channel therewith; positive stop means operatively associated with said end surfaces and constructed and arranged to positively limit axial movement of the first and second fluid confining elements toward one another; an elongated flexible element received in said channel; and tightening means for radially constricting said elongated flexible element to force the elongated flexible element more deeply in said channel said flexible element being so constructed and arranged that when it is radially constricted it will engage the said rear surface and said wedging surfaces thereby forcing said rear surface and said wedging surfaces axially farther apart and thereby force said seal means into sealing engagement with said elements and also force said stop means into engagement to positively limit further axial movement of the first and second fluid confining elements toward one another.

References Cited by the Examiner

UNITED STATES PATENTS

| | | | |
|---|---|---|---|
| 1,252,637 | 1/1918 | Westcott | 24—276 |
| 2,330,864 | 10/1943 | Bruno | 285—332.2 |
| 2,439,161 | 4/1948 | DuBois | 285—330 X |
| 2,523,928 | 9/1950 | Szekely | 285—410 X |
| 2,697,570 | 12/1954 | Snyder | 285—367 X |
| 2,766,999 | 10/1956 | Watts et al. | 285—367 X |
| 3,109,215 | 11/1963 | Brown | 24—276 |

FOREIGN PATENTS

| | | |
|---|---|---|
| 607,240 | 10/1960 | Canada. |
| 566,656 | 11/1926 | France. |
| 1,035,989 | 8/1958 | Germany. |

CARL W. TOMLIN, *Primary Examiner.*

D. W. AROLA, *Assistant Examiner.*